United States Patent Office 3,357,915
Patented Dec. 12, 1967

3,357,915
REGENERATION OF HYDROCRACKING
CATALYSTS
Dean Arthur Young, Yorba Linda, Calif., assignor to Union Oil Company of California, Los Angeles, Calif., a corporation of California
No Drawing. Filed Mar. 28, 1966, Ser. No. 537,678
7 Claims. (Cl. 208—111)

This application is a continuation-in-part of application Ser. No. 452,897, filed May 3, 1965, now abandoned, which is in turn a continuation-in-part of application Ser. No. 214,802, filed Aug. 6, 1962, now abandoned.

This invention relates to the catalytic hydrocracking of high-boiling hydrocarbons to produce therefrom lower boiling hydrocarbons, boiling for example in the gasoline or jet fuel range. The invention is directed more specifically to certain novel methods for regenerating sulfided, deactivated hydrocracking catalysts of a special type comprising a zeolitic, alumino-silicate molecular sieve type cracking base, upon which is distended a Group VIII, noble metal sulfide hydrogenating component. Briefly, the basic novel feature of the regeneration technique involves a two-step treating sequence, wherein the deactivated catalyst is first subjected to exhaustive reduction with hydrogen at elevated temperatures for a lengh of time exending at least one hour beyond the point at which the sulfur content of the catalyst has been reduced to a substantially consant level, and the reduced catalyst is then subjected to oxidation with an oxygen-containing gas at elevated temperatures to burn off carbonaceous deposits such as coke and the like. Preferably, the oxidized catalyst is then again reduced with hydrogen (permissibly under less severe conditions than the first reduction), and placed on-stream again. It has been found, with reference to the particular type of catalysts here concerned, that the reduction-oxidation-reduction sequence of treatment gives a substantially more active regenerated catalyst than the normal two-step oxidation-reduction treatment.

It is a principal object of this invention to provide methods for effecting substantially complete regeneration of hydrocracking catalysts composed of zeolitic molecular sieve cracking bases upon which is distended a Group VIII noble metal sulfide hydrogenating component, where such catalysts have become deactivated during hydrocracking by the deposition of carbonaceous materials and/or nitrogen-containing deposits, and the like. The overall objective is to extend the total active life of such catalysts, and to obtain the most efficient use thereof during their life span. Other objects will be more apparent from the detailed description which follows.

It is well known that, under hydrocracking conditions, the activity of hydrocracking catalysts declines gradually, the rate of deactivation depending to a large extent upon the severity of the hydracracking conditions, and refractoriness of the feedstock employed. It is known further that activity of such deactivated catalysts may be restored to a considerable degree by combustion with oxygen-containing gases, which combustion is sometimes followed by a hydrogenation-reduction step.

It has now been found that this conventional regeneration procedure does not restore the sulfided catalysts of this invention to their original activity; in many cases less than about 50% of the original activity is recovered. It has been further discovered however that, by first reducing the catalysts exhaustively with hydrogen, and then oxidizing to remove carbonaceous materials, the catalysts are restored to essentially their original activity. While it is not intended to limit the invention to any theoretical explanation for the observed results, it is believed that the initial reduction treatment removes part of the sulfur on the catalyst as $H_2S$, and causes the remaining sulfur to be redistributed and/or modified, so that upon oxidation the combustion gases formed are substantially free of sulfur oxides, which appear to exert a damaging effect on the crystal structure of the zeolite component of the catalyst.

The major component of the hydracracking catalysts of this invention is a zeolitic alumino-silicate molecular sieve cracking base having relatively uniform crystal pore diameters between about 6 and 14 A. In addition to silica and alumina, these molecular sieve cracking bases also contain a substantial proportion of one or more zeolitic cations, e.g., hydrogen, alkali metals such as sodium, or polyvalent metals such as the rare earth metals or alkaline earth metals, particularly calcium or magnesium. Prime examples of suitable molecular sieves are those of the "X," "Y" or "L" crystal types. Synthetic mordenite may also be used. Molecular sieves of the "X" crystal type are more particularly described in U.S. Patent No. 2,882,244.

A particularly active and useful class of molecular sieve cracking bases are those having a relatively high $SiO_2/Al_2O_3$ mole-ratio, i.e., between about 3.0 and 10. The most active forms are those wherein the exchangeable zeolitic cations are hydrogen and/or a polyvalent metal, e.g., magnesium, chromium, calcium, zinc, or the rare earth metals, e.g., cerium. In particular, the "Y" molecular sieves, wherein the $SiO_2/Al_2O_3$ mole-ratio is about 3/1 to 6/1 are preferred, either in their hydrogen form, or a polyvalent metal form. Normally, such molecular sieves are prepared first in the sodium or potassium form, and the monovalent metal is ion-exchanged out with a suitable solution of a polyvalent metal salt, or where the hydrogen form is desired, with an ammonium salt followed by heating to decompose the zeolitic ammonium ion and leave a hydrogen ion. It is not necessary to exchange out all of the monovalent metal; the final compositions may contain up to about 6% by weight of $Na_2O$, or equivalent amounts of other monovalent metals. Molecular sieves of the Y type are described more particularly in U.S. Patents 3,130,007 and 3,130,006.

In using the hydrogen, or "decationized' form of Y sieves, it has been found preferable in many cases to co-pellet the powdered Y sieve (before or after addition of the hydrogenating metal) with, e.g., 20–80% by weight of a powdered, adsorbent oxide spacer such as activated alumina, or activated alumina impregnated with 0.1–20% by weight of a hydrogenating metal such as palladium. The same technique may be preferred in using other types of molecular sieves. This copelleting procedure is found to increase the activity and reduce the coking and deactivation rate of the catalyst.

As in the case of the X molecular sieves, the Y sieves also contain pores of relatively uniform diameter in the individual crystals. In the case of X sieves, the pore diameters may range between about 6 and 14 A., depending upon the metal ions present, and this is likewise the case in the Y sieves, although the latter usually are found to have pores of about 9 to 10 A. in diameter.

The foregoing molecular sieve cracking bases are compounded as by impregnation, but preferably by cation exchange, with from about 0.05% to 25% by weight (based on free metal) of a Group VIII noble metal hydrogenating promoter, e.g., platinum, palladium, rhodium, iridium, or any combination thereof. Where platinum or palladium is employed, only about 0.05% to 2% by weight is normally required.

Where the hydrogenating component is added by impregnation, conventional methods are used, involving merely soaking the molecular sieve in an aqueous solution of a suitable salt of the metal, followed by draining, drying and calcining to convert the hydrogenating component to an oxide, or the free metal. Where the preferred cation exchange method is employed (which gives a more uniform and finely divided dispersion of the metal on the molecular sieve), the molecular sieve in its alkali metal or ammonium form is digested in an aqueous solution of a suitable compound of the desired hydrogenating metal, wherein the metal is present in cationic form, and the ion-exchanged zeolite is then reduced to form the free metal, as described for example in Belgian Patent No. 598,686.

The preferred hydrocracking catalysts for use herein are those composed of a Y type molecular sieve cracking base having a $SiO_2/Al_2O_3$ mole-ratio of at least about 4, either in its hydrogen form (decationized), or in a polyvalent metal form, particularly the magnesium, calcium or rare earth metal forms. The Group VIII noble metal hydrogenating component is preferably palladium.

The sulfided forms of the foregoing catalysts may result from a presulfiding operation with hydrogen sulfide, and/or from the progressive sulfiding of the catalyst during hydrocracking of sulfur-containing feeds. Also, in some cases the hydrogenating metal may be initially added to the zeolite as a colloidal sulfide hydrosol.

The fresh catalysts are initially very active for hydrocracking, and this activity can, under suitable hydrocracking conditions be maintained for long periods of time, e.g., 6 months or more. The accumulation of coke and other deactivating deposits however will eventually reduce the activity to a level such that regeneration is desirable. Ordinarily, regeneration becomes desirable when about 1 to 10% by weight of non-volatile, benzene-insoluble, carbonaceous deposits have been formed upon the catalyst. The catalysts at this stage will normally contain sulfur in amounts within the range of about 0.1 to 5% by weight.

In the reducing step, the primary variables to be considered are temperature and time of treatment, the two being interrelated. At temperatures below about 650° F., the reduction is undesirably slow, and may require several days for completion. It is preferred to carry out the reduction at tempearures between about 750° and 1,100° F. for periods of time ranging between about 2 and 100 hours. The higher the temperature employed, the shorter will be the time required. It is desirable, however, not to exceed reduction temperatures of about 1,300° F., because treatment at excessively high temperatures may result in irreversible damage to the catalyst. The reducing gas employed may comprise any suitable hydrogen-containing gas of, e.g., 50–100% hydrogen concentration, and may include inert diluents such as nitrogen, steam, flue gases and the like. Normally the reducing treatment is carried out at atmospheric pressures, but either subatmospheric or superatmospheric pressures may be utilized.

It is important to note that the above reducing treatment is more severe and/or extended than normal purging or stripping techniques which are sometimes employed to strip volatile hydrocarbons from the catalyst before oxidation. Hydrogen may sometimes be used for such purposes, but such treatments are normally complete in 1–2 hours, and are discontinued when the effluent gases become free of hydrocarbons. The reducing treatment required herein is not only continued beyond the point at which the off-gases become free of volatile hydrocarbons, but beyond the point at which the sulfur content of the catalyst has been reduced to a substantially constant level. After most of the volatile hydrocarbons have been stripped from the catalyst, a substantial portion of the sulfur is removed as hydrogen sulfide which appears in the off-gases. However, a portion of the sulfur appears to become affixed to the catalyst in a substantially non-reducible form, herein termed "residual" sulfur. When only residual sulfur remains, the total sulfur level on the catalyst remains substantially constant and the off-gases become free of hydrogen sulfide. It is important to observe that, in order to obtain the results desired herein, it is necessary to continue the hydrogen reduction for a substantial time, e.g., at least 1 hour and preferably at least about 5 hours beyond the point at which a constant sulfur level has been reached.

Upon completion of the hydrogen reducing step, the catalyst bed is then purged with nitrogen or other inert gas to displace hydrogen from the reactor, and then the oxidation step is commenced. Since the oxidation is exothermic, care must be exercised to avoid temperature in excess of about 1,300° F., in that such high temperatures tend to deactivate the catalyst by inducing fundamental changes in the physical structure. The oxidation is carried out at temperatures between about 600° and 1,200° F., preferably 700°–1,100° F., using dilute oxygen-containing gases, as for example flue gases or nitrogen containing from about 0.2 to about 5% by volume or oxygen. The oxidation is preferably carried out at atmospheric pressures, but either subatmospheric or superatmospheric pressures may be used; the time required is normally between about 1 and 30 hours.

Preferably, the initial portion of the oxidation is carried out at relatively low temperatures, below 900° F., and still more preferably below about 850° F., and after about 1–6 hours, the temperatures is raised to about 850°–1,100° F., to complete the oxidation. At oxidation temperatures below about 900° F., it is desirable to maintain substantially dry conditions, i.e., the partial pressure of water vapor should be below about 1 p.s.i.a.

Upon completion of the oxidation step, the catalyst may be subjected to an optional second reduction with hydrogen if desired. This second reducing step is normally not as severe or extended as the first reducing step, and will usually be complete after about 2 to 10 hours at, e.g., 700° to 1,000° F. If desired, the metal may also be converted to a sulfide form by including, e.g., 1 to 10% by volume of hydrogen sulfide with the reducing gas.

The regenerated catalysts of this invention may be employed for the hydrocracking of substantially any mineral oil fraction boiling above the conventional gasoline range, i.e., above about 300° F., and usually above about 400° F., and having an end-boiling-point up to about 1,000° F., but preferably not greater than about 850° F. These feedstocks may be sulfur-free, or they may contain up to about 5% by weight of sulfur, in the form of organic sulfur compounds. They may also contain organic nitrogen compounds, but if nitrogen compounds are present it is ordinarily necessary to utilize hydrocracking temperatures in the upper ranges hereinafter defined. Specific feedstocks contemplated comprise straight-run gas oils and heavy naphthas, coker distillate gas oils and heavy naphthas, deasphalted crude oils, cycle oils derived from catalytic or thermal cracking operations and the like. These feedstocks may be derived from petroleum crude oils, shale oils, tar sand oils, coal hydrogenation products and the like. Specifically, it is preferred to employ oils having an end-boiling-point between about 500° and 750° F., an API gravity between about 30 and 35°, and containing at least about 20% by volume of acid-soluble components (aromatics plus olefins).

Hydrocracking conditions to be employed herein (either with the fresh catalyst or the regenerated catalyst) fall within the following ranges:

TABLE 1

|  | Operative | Preferred |
|---|---|---|
| Temperature, ° F | 400–900 | 550–800 |
| Pressure, p.s.i.g. | 500–5,000 | 750–2,000 |
| H₂/oil ratio, SCF/B | 1,000–15,000 | 2,000–10,000 |
| LHSV | 0.1–20 | 0.5–8 |

Those skilled in the art will readily understand that when ranges of operating conditions are specified as above, a large number of determinative factors are involved. Thus, highly active catalysts, or freshly regenerated catalysts, will be used in conjunction with lower temperatures than will less active, or partially deactivated, catalysts. The lower limit of pressure to be utilized in a given operation will normally depend upon the desired run length. Lower pressures generally result in a more rapid deactivation of the catalyst, and hence where extremely long run lengths are desired, pressures, above about 1,000 p.s.i.g. are desirable. However, economically feasible run lengths are normally obtainable with most catalysts and feedstocks within the 600 to 2,000 p.s.i.g. pressure range. Aside from the foregoing considerations, the conditions of temperature and space velocity will be suitably correlated and adjusted so as to provide a conversion per pass to gasoline, or other desired product, of about 30 to 80% by volume in normal operations.

The following examples are cited to illustrate the critical nature of the novel features of my invention, but such examples are not to be construed as limiting in scope.

*Example I*

To demonstrate the efficacy of the regeneration technique of this invention, a partially deactivated hydrocracking catalyst which had been coked and sulfided for 240 hours was first reduced with hydrogen for 24 hours at 800° F. and 4 hours at 850° F., and then oxidized with dry air for 48 hours at 800° F. Both the reduction and the oxidation were carried out at atmospheric pressure. (This hydrocracking catalyst was a hydrogen, or "decationized" form of Y molecular sieve, having a $SiO_2/Al_2O_3$ mole-ratio of about 5, and containing 0.5% by weight of palladium. The regenerated catalyst was then tested for hydrocracking n-dodecane at 1,000 p.s.i.g., 8 LHSV, 20,000 s.c.f. of hydrogen per barrel of feed, and 553° F. The product obtained had an API gravity of 60.0° and contained 17.1% by volume of $C_3$–$C_9$ hydrocarbons, which indicates a slightly higher activity than that of the fresh catalyst. (The fresh catalyst gave a product containing only 15.2 volume-percent $C_3$–$C_9$ hydrocarbons under these conditions.)

In contrast to the foregoing, a sample of the same catalyst deactivated with only 0.5% coke was regenerated in the more conventional manner by first oxidizing with air at 800° F. for 16 hours, and then reducing with hydrogen for 16 hours at 800° F. The product obtained from hydrocracking n-dodecane with this regenerated catalyst, under the same hydrocracking conditions, had an API gravity of only 58.2 and contained only about 6.7% by volume of $C_3$–$C_9$ hydrocarbons, indicating a substantially lower activity than the fresh catalyst.

In both of the foregoing cases, the respective regenerated catalysts had negligible amounts of carbon and sulfur remaining thereon before the activity test runs.

*Example II*

This example demonstrates more specifically the need for exhaustive pre-reduction, as compared to minimal hydrogen stripping treatments. The catalyst was a magnesium "Y" molecular sieve loaded by ion-exchange with 0.5% by weight palladium. This catalyst had an initial activity such that upon hydrocracking n-dodecane under the conditions of Example I (temperature 650° F.) a product containing 42% by volume of $C_3$–$C_9$ hydrocarbons was obtained. After coking and sulfiding for 3,260 hours, the activity declined to such an extent that the product contained only 2.4% $C_3$–$C_9$ hydrocarbons at a hydrocracking temperature of 672° F. Two portions, A and B, of the deactivated catalyst were then regenerated as follows:

Portion A was stripped with hydrogen for 2 hours at 800° F. and atmospheric pressure, and then oxidized with 2% oxygen for 24 hours at 600° F. and 48 hours at 800° F. and atmospheric pressure.

Portion B was regenerated in the same manner except that the hydrogen reduction was continued for 98 hours.

Analysis of the respective catalysts after the reduction steps, and after the oxidation steps gave the following results:

| Catalyst portion, wt. percent | A | | B | |
|---|---|---|---|---|
| | After 2 hr. reduction | After oxidation | After 98 hr. reduction | After oxidation |
| Hydrogen | 0.54 | | 0.51 | |
| Carbon | 11.4 | 0.1 | 11.5 | 0.1 |
| Sulfur | 0.53 | 0.59 | 0.53 | 0.59 |

It is thus evident that the 98-hour reduction did not effect any significant removal of volatile materials or residual sulfur after the initial 2-hour stripping and reduction.

The regenerated catalysts were then tested for hydrocracking activity using n-dodecane feed and pressures, hydrogen rates and feed rates as in Example I. The results were as follows, at the temperatures indicated:

| Catalyst portion, hydrocracking temp., ° F. | A | | B | |
|---|---|---|---|---|
| | 601 | 651 | 602 | 651 |
| Product Gravity, ° API | 56.2 | 60.5 | 56.7 | 64.0 |
| Vol. percent $C_3$–$C_9$ hydrocarbons in product | 0.59 | 20.8 | 2.3 | 34.6 |

It is thus evident that the exhaustive reduction of catalyst B produced some change in the catalyst not attributable to mere stripping or sulfur removal, such that upon oxidation a much more active regenerated catalyst was obtained.

*Example III*

Two portions, C and D, of the deactivated catalyst of Example II, were regenerated as follows:

Portion C was reduced with hydrogen for 10 hours at 900° F., and then oxidized with 2% oxygen for 4 hours at 1600° F. and 16 hours at 800° F., all treatments being at atmospheric pressure.

Portion D was regenerated in the same manner except that nitrogen was used in place of the initial hydrogen treatment.

Upon hydrocracking n-dodecane at 600° F., and conditions otherwise the same as in Example I, the results were as follows:

| Catalyst portion | C | D |
|---|---|---|
| Product gravity, ° API | 57.4 | 56.7 |
| Vol. percent $C_3$–$C_9$ hydrocarbons in product | 4.15 | 1.62 |

This example demonstrates that reduction at 900° F. for 10 hours is superior to reduction at 800° F. for 98 hours, and also that a nitrogen purge is not the equivalent of the hydrogen reduction step.

Substantially similar differential results are obtained when other hydrocracking catalysts within the purview of this invention are treated as in the foregoing examples. It is therefore not intended that the invention should be limited to the details of the examples, but broadly as defined in the following claims.

I claim:

1. A method for regenerating a deactivated hydrocracking catalyst comprising a zeolitic alumino-silicate molecular sieve cracking base and a Group VIII noble metal hydrogenating component, said catalyst being in a substantially sulfided condition containing at least about 0.1 percent by weight of sulfur, and also containing substantial amounts of deactivating carbonaceous deposits formed during a previous contacting with a hydrocarbon feedstock at elevated temperatures, which comprises:

(1) substantially completely stripping volatile hydrocarbons from said deactivated catalyst;

(2) subjecting the stripped catalyst to reduction by contacting with a stream of gas consisting essentially of hydrogen at a temperature between about 650° and 1,300° F. for a length of time extending at least about five hours beyond the point at which the sulfur content of the catalyst has been reduced to a substantially constant level; and (3) subjecting the reduced catalyst to oxidation by contacting with an oxygen-containing gas at elevated temperatures to burn off said carbonaceous materials.

2. A method as defined in claim 1 wherein said molecular sieve cracking base is of the "Y" crystal type having pores of relatively uniform diameter between about 6 and 14 A., a $SiO_2/Al_2O_3$ mole-ratio between about 3 and 6, and comprising zeolitic cations from the class consisting of hydrogen and polyvalent metals.

3. A method as defined in claim 1 wherein said reduction step (2) is effected at temperatures above about 750° F.

4. A process for hydrocracking a hydrocarbon feedstock to produce lower boiling hydrocarbons, which comprises contacting said feedstock plus added hydrogen and under hydrocracking conditions with a hydrocracking catalyst comprising a zeolitic alumino-silicate molecular sieve cracking base and a Group VIII noble metal hydrogenating component, said hydrocracking catalyst having been previously utilized for hydrocracking a sulfur-containing feed to a point of substantial deactivation with concomitant deposition of deactivating carbonaceous deposits and at least about 0.1 percent by weight of sulfur thereon, and having been then regenerated by:

(1) substantially completely stripping volatile hydrocarbons from said deactivated catalyst;

(2) subjecting the stripped catalyst to reduction by contacting with a stream of gas consisting essentially of hydrogen at a temperature between about 650° and 1,300° F. for a length of time extending at least about five hours beyond the point at which the sulfur content of the catalyst has been reduced to a substantially constant level; and (3) subjecting the reduced catalyst to oxidation by contacting with an oxygen-containing gas at elevated temperatures to burn off said carbonaceous materials.

5. A process as defined in claim 4 wherein said hydrocarbon feedstock is a mineral oil fraction boiling above the gasoline range, and said lower-boiling hydrocarbons produced therefrom boil in the gasoline range.

6. A process as defined in claim 4 wherein said molecular sieve cracking base is of the "Y" crystal type having pores of relatively uniform diameter between about 6 and 14 A., a $SiO_2/Al_2O_3$ mole-ratio between about 3 and 6, and comprising zeolitic cations from the class consisting of hydrogen and polyvalent metals.

7. A process as defined in claim 4 wherein said hydrogen reducing step (2) is effected at a temperature above about 750° F.

References Cited
UNITED STATES PATENTS

| | | | |
|---|---|---|---|
| 2,732,329 | 1/1956 | Doumani | 208—137 |
| 2,780,584 | 2/1957 | Doumani | 208—137 |
| 3,197,397 | 7/1965 | Wight et al. | 208—111 |
| 3,242,067 | 3/1966 | Arey et al. | 208—111 |

ABRAHAM RIMENS, *Primary Examiner.*